United States Patent
Ogaki et al.

(10) Patent No.: US 10,031,430 B2
(45) Date of Patent: Jul. 24, 2018

(54) ELECTROPHOTOGRAPHIC PHOTOSENSITIVE MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Harunobu Ogaki, Suntou-gun (JP); Kazunori Noguchi, Suntou-gun (JP); Kazumichi Sugiyama, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/432,835

(22) Filed: Feb. 14, 2017

(65) Prior Publication Data

US 2017/0242352 A1    Aug. 24, 2017

(30) Foreign Application Priority Data

Feb. 19, 2016    (JP) .................... 2016-030169

(51) Int. Cl.

| | | |
|---|---|---|
| G03G 5/147 | (2006.01) |
| G03G 5/047 | (2006.01) |
| C08G 63/189 | (2006.01) |
| C08G 63/193 | (2006.01) |
| G03G 5/043 | (2006.01) |
| G03G 21/18 | (2006.01) |

(52) U.S. Cl.
CPC ........... *G03G 5/047* (2013.01); *C08G 63/189* (2013.01); *C08G 63/193* (2013.01); *G03G 5/043* (2013.01); *G03G 21/18* (2013.01)

(58) Field of Classification Search
CPC .......................... G03G 5/14713; G03G 15/00
See application file for complete search history.

(56) References Cited

U.S. PATENT DOCUMENTS

2003/0077531 A1 *    4/2003    Suzuki ..................... G03G 5/10
                                                           430/66
2003/0190540 A1 *    10/2003   Shoshi ................. C07D 209/58
                                                           430/78

FOREIGN PATENT DOCUMENTS

| JP | 10-20514 A | 1/1998 |
|---|---|---|
| JP | 3492125 B2 | 2/2004 |
| JP | 2006-53549 A | 2/2006 |
| JP | 2007-79555 A | 3/2007 |
| JP | 2008-74714 A | 4/2008 |
| JP | 2011-007914 A | 1/2011 |
| JP | 2011-26574 A | 2/2011 |

\* cited by examiner

*Primary Examiner* — Peter L Vajda
(74) *Attorney, Agent, or Firm* — Canon U.S.A.Inc., IP Division

(57) ABSTRACT

An electrophotographic photosensitive member including a surface layer containing a specific polyester resin is provided. The polyester resin contains specific structures.

6 Claims, 1 Drawing Sheet

ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

Field of the Invention

The present disclosure relates to an electrophotographic photosensitive member, a process cartridge, and an electrophotographic apparatus.

Description of the Related Art

In an electrophotographic process, the surface of the electrophotographic photosensitive member mounted in an electrophotographic apparatus will come in contact with a developer, a printing medium (paper), a charging member, a transfer member, a cleaning member, and the like. Accordingly, as the number of printed sheets is increased, the surface of the electrophotographic photosensitive member is more worn or damaged. This can affect the image quality of resulting graphics or text. In recent years, high-volume printing and high-speed printing have been required of electrophotographic processes. Accordingly, even though an electrophotographic photosensitive member has such a durability that it can be kept from being worn or damaged by contact when the number of printed sheets is that in conventional printing, the electrophotographic photosensitive member is required to have higher durability. Accordingly, Japanese Patent Laid-Open Nos. 10-20514, 2006-53549, and 2011-7914 disclose techniques using a photosensitive member including a surface layer made of a polyester resin having a high mechanical strength. Japanese Patent Laid-Open Nos. 10-20514 and 2006-53549 disclose an electrophotographic photosensitive member including a surface layer made of a polyester resin containing a diphenyl ether dicarboxylic acid moiety. Japanese Patent Laid-Open No. 2011-7914 discloses an electrophotographic photosensitive member including a surface layer made of a polyester resin containing a divalent phenol derivative containing three or more aromatic rings that are connected to each other. Any of these disclosures describes that the durability of the electrophotographic photosensitive member is improved.

SUMMARY OF THE INVENTION

The present disclosure provides an electrophotographic photosensitive member including a surface layer containing a polyester resin. The polyester resin has structures represented by general formula (I) and a structure represented by general formula (II):

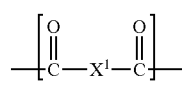

wherein in general formula (I), $X^1$ represents a divalent group.

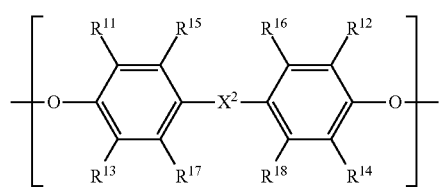

wherein in general formula (II), $X^2$ represents one selected from the group consisting of a single bond, an oxygen atom, a divalent alkylene group, and a divalent cycloalkylene group, and $R^{11}$ to $R^{18}$ each represent a hydrogen atom or an alkyl group.

The structures represented by general formula (I) include the structure represented by formula (I-1) and the structure represented by formula (I-2):

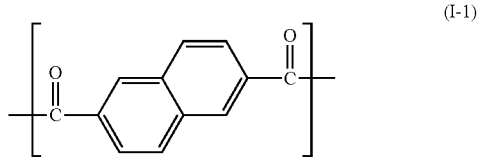

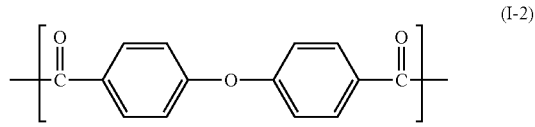

According to another aspect of the present disclosure, a process cartridge capable of removably mounted to an electrophotographic apparatus is provided. The process cartridge includes the above-described electrophotographic photosensitive member and at least one device selected from the group consisting of a charging device, a developing device, a transfer device, and a cleaning device. The electrophotographic photosensitive member and these devices are held in one body.

Also, an electrophotographic apparatus is provided. The apparatus includes the above-described electrophotographic photosensitive member, a charging device, an exposure device, a developing device, and a transfer device.

Further features of the present disclosure will become apparent from the following description of exemplary embodiments with reference to the attached drawings.

DESCRIPTION OF THE EMBODIMENTS

Figure 1:
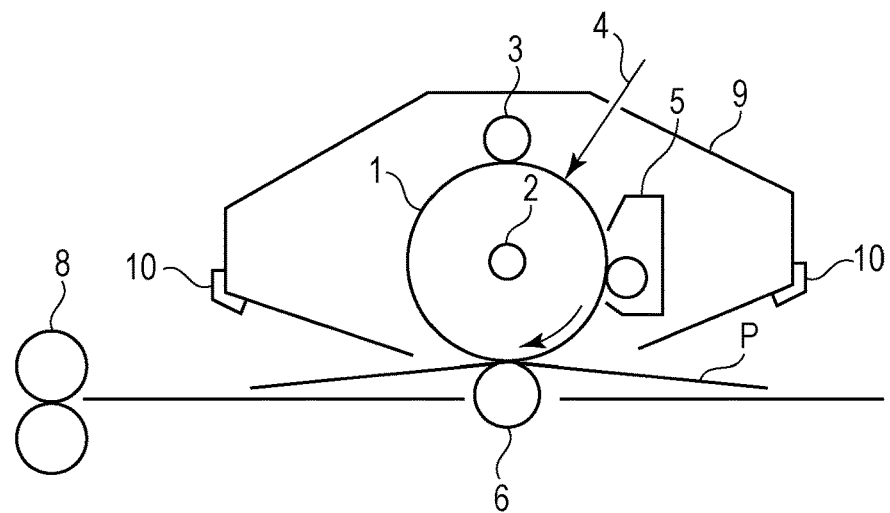
FIG. 1 is a schematic view of the structure of an electrophotographic apparatus provided with a process cartridge.

In an examination by the present inventors, the electrophotographic photosensitive members using a polyester resin disclosed in the above-cited Japanese Patent Laid-Open Nos. 10-20514, 2006-53549, and 2011-7914 exhibited improved durability. However, the durability did not reach the level required in recent years.

Accordingly, the present disclosure provides a highly durable electrophotographic photosensitive member. The present disclosure also provides a process cartridge and an electrophotographic apparatus that include the electrophotographic photosensitive member.

The electrophotographic photosensitive member according to an embodiment of the present disclosure includes a surface layer containing a charge transporting material and a polyester resin. The polyester resin contains structures represented by general formula (I) and a structure represented by general formula (II). The structures represented by general formula (I) include the structure represented by formula (I-1) and the structure represented by formula (I-2).

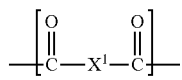

In general formula (I), $X^1$ represents a divalent group. Examples of the divalent group include phenylene, biphenylene, naphthylene, alkylene, cycloalkylene, and a divalent group (-Ph-O-Ph-) having two p-phenylene groups bound with an oxygen atom.

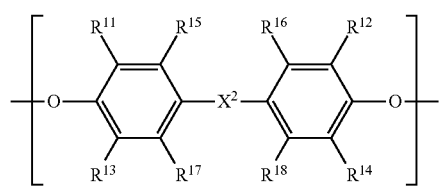

In general formula (II), $X^2$ represents one selected from the group consisting of a single bond, an oxygen atom, a divalent alkylene group, and a divalent cycloalkylene group, and $R^{11}$ to $R^{18}$ each represent a hydrogen atom or an alkyl group.

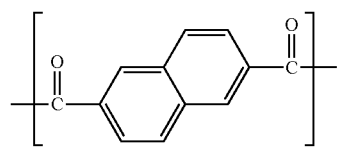

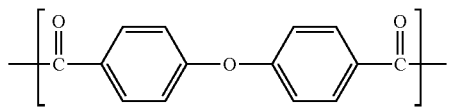

The present inventors assume that the above-described constitution provides a high durability through the following mechanism. The present inventors studied the conditions under which the electrophotographic photosensitive member can exhibit high durability and reached a finding that the surface layer of the electrophotographic photosensitive member should be formed of a rigid material in order to prevent flaws from being formed by contact with various materials and other members. The inventors also found that in the case of only use of a rigid material, a small flaw, if it is formed in the surface, is likely to extend in the depth direction or the surface is easily worn by contact. The present inventors finally found through further studies that it is advantageous for reducing the pressure applied by contact and the extension of the flaw in the depth direction that the surface layer be made of a flexible material.

Then, the present inventors select the structure represented by formula (I-1) and the structure represented by formula (I-2) from the dicarboxylic acid compounds (compounds deriving structures represented by general formula (I)) capable of reacting with a bisphenol compound deriving a structure represented by general formula (II) to synthesize a polyester material. The structure represented by formula (I-1) has a high rigidity due to the naphthalene structure thereof. On the other hand, the structure represented by formula (I-2) has a high flexibility due to the diphenyl ether structure in which rigid benzene rings are connected with an ether bond therebetween. The polyester resin having these structures together can synergistically reduce flaws and wear effectively and thus exhibits high durability that cannot be exhibited in the case of using one of these structures.

In general formula (II), $X^2$ represents one selected from the group consisting of a single bond, an oxygen atom, a divalent alkylene group, and a divalent cycloalkylene group. Advantageously, $X^2$ represents a single bond.

If $X^2$ represents a divalent alkylene group, the divalent alkylene group may have a substituent. Examples of the divalent alkylene group include substituted or unsubstituted methylene, substituted or unsubstituted ethylene, substituted or unsubstituted propylene, and substituted or unsubstituted butylene. Desirably, the divalent alkylene group is substituted or unsubstituted methylene. If the divalent alkylene group has a substituent, examples of the substituent include methyl, ethyl, propyl, isopropyl, and butyl.

If $X^2$ represents a divalent cycloalkylene group, the divalent cycloalkylene group may have a substituent. The ring of the divalent cycloalkylene group desirably has a carbon number of 5 to 18, more desirably 6 to 12. If the divalent cycloalkylene group has a substituent, the substituent may be a methyl group.

If $R^{11}$ to $R^{18}$ of general formula (II) are alkyl groups, the alkyl groups include methyl, ethyl, propyl, isopropyl, and butyl. Methyl is advantageous.

Examples of the structure represented by general formula (II) include:

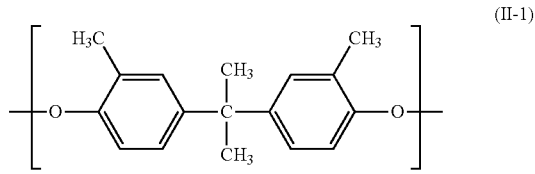

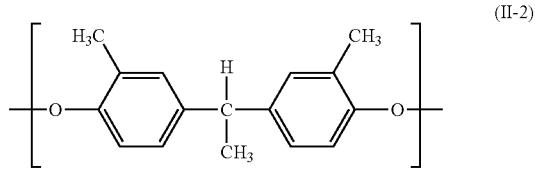

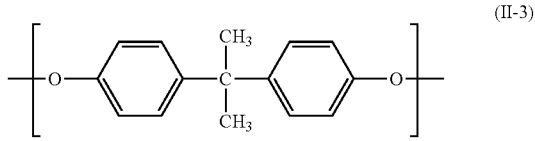

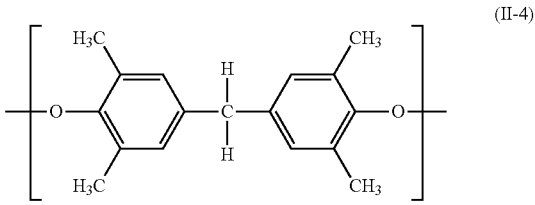

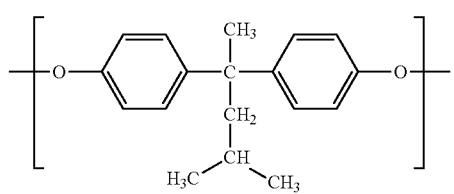
(II-5)

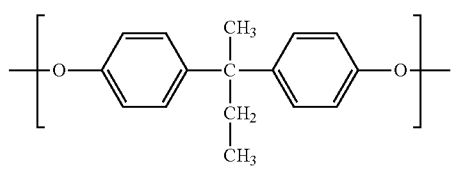
(II-6)

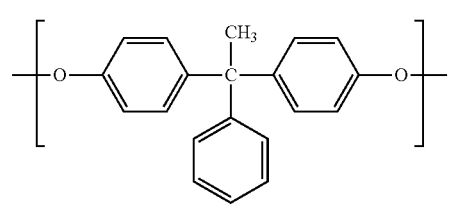
(II-7)

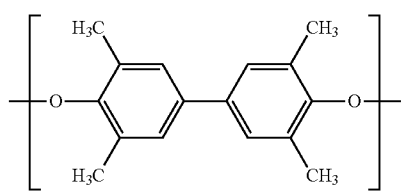
(II-8)

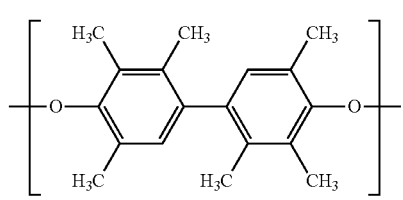
(II-9)

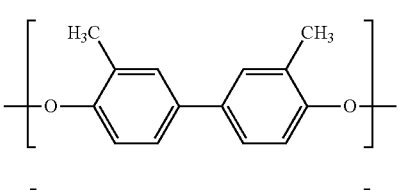
(II-10)

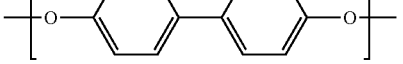
(II-11)

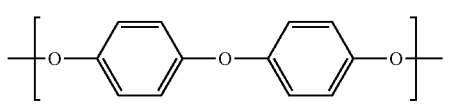
(II-12)

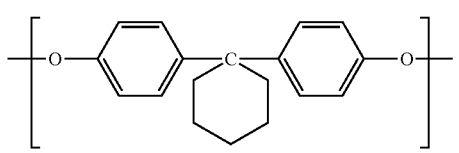
(II-13)

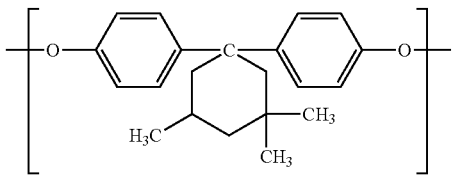
(II-14)

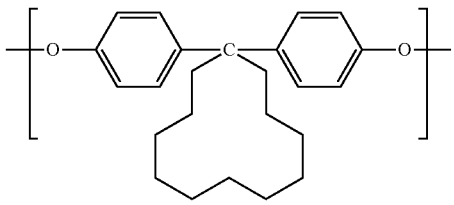
(II-15)

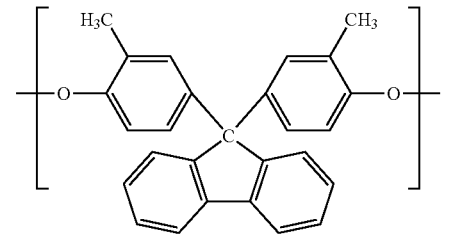
(II-16)

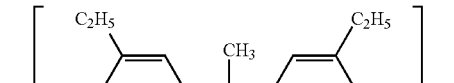
(II-17)

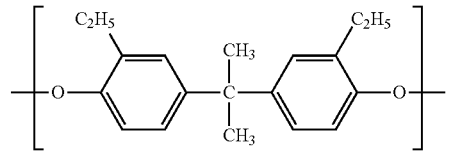
(II-18)

Among these, the structures represented by any one of the formulas (II-1), (II-5), (II-6), (II-7), (II-8), (II-9), (II-10), (II-12), and (II-15) are advantageous from the viewpoint of reducing degradation of image quality, resulting from scratches caused by repeated use of the electrophotographic photosensitive member. The structures represented by any one of formulas (II-5), (II-6), (II-8), and (II-15) are more advantageous.

When the polyester resin has the structures represented by formula (I-1) and formula (I-2) as the structures represented by general formula (I), the subject matter of the present disclosure produces an advantageous effect. In addition, when the structure represented by formula (I-1) accounts for 25% by mole to 75% by mole of the total moles of the structures represented by general formula (I), the structure of formula (I-1) can impart the rigidity thereof to the polyester resin, thereby markedly enhancing scratch resistance. Also, when the structure represented by formula (I-1) accounts for 25% by mole to 75% by mole of the total moles of the structures represented by general formula (I), mobility that is an index representing the response of the electrophotographic photosensitive member is advantageously increased. More advantageously, the structure represented by formula (I-1) accounts for 25% by mole to 50% by mole of the total moles of the structures represented by general formula (I). Desirably, the structure represented by formula (I-2) accounts for 25% by mole to 75% by mole, more desirably 50% by mole to 75% by mole, of the total moles of the structures represented by general formula (I).

The polyester resin may further contain other structures represented by general formula (I) in addition to the structures represented by formula (I-1) and formula (I-2). Examples of such structures include structures derived from carboxylic acids, such as terephthalic acid, isophthalic acid, biphenyldicarboxylic acid, and aliphatic dicarboxylic acid. The copolymerized form of these structures may be in any form, such as block copolymer, random copolymer, or alternating copolymer.

The surface layer may further contain any other resin as a binder resin. Such resins include polyester resin other than the above-described polyester resin, polycarbonate resin, polymethacrylic acid ester resin, polysulfone resin, and polystyrene resin. Some of these resins may be mixed or copolymerized. The copolymer of these resins may be in any form, such as block copolymer, random copolymer, or alternating copolymer. If any of these resins other than the polyester resin concerned is used, it is desirable that the proportion of the mass of the above-described polyester resin to the total mass of the binder resins be 50% by mass or more.

The weight average molecular weight of the polyester resin is in the range of 60,000 to 200,000, such as in the range of 80,000 to 150,000. This weight average molecular weight refers to the polystyrene-equivalent weight average molecular weight measured by the method disclosed in Japanese Patent Laid-Open No. 2007-79555.

Electrophotographic Photosensitive Member

The electrophotographic photosensitive member according to an embodiment of the present disclosure includes the surface layer. The electrophotographic photosensitive member may further include a support member and a photosensitive layer. The photosensitive layer may be: (1) a multilayer photosensitive layer; or (2) a single-layer photosensitive layer. (1) The multilayer photosensitive layer includes a charge generating layer containing a charge generating material, and a charge transport layer containing a charge transporting material. (2) The single-layer photosensitive layer is a photosensitive layer containing a charge generating material and a charge transporting material together. The photosensitive layer may be covered with a protective layer. In the present embodiment, the uppermost layer, or surface layer, of the layers constituting the electrophotographic photosensitive member contains the polyester resin containing the structure represented by formula (I-1), the structure represented by formula (I-2), and a structure represented by general formula (II).

These layers will now be described.

The electrophotographic photosensitive member may be produced by applying each of the coating liquids prepared for forming the layers thereof, which will be described later, in a desired order, and drying the coatings. The coating liquids may be applied by dipping (dip coating), spray coating, curtain coating, or spin coating. From the viewpoint of efficiency and productivity, dipping is advantageous.

Support Member

The electrophotographic photosensitive member may include a support member. Desirably, the support member is electrically conductive. The electrically conductive support member may be made of a metal, such as aluminum, iron, nickel, copper, or gold, or an alloy thereof. Alternatively, an insulating support member made of, for example, a polyester resin, a polycarbonate resin, a polyimide resin, or glass may be coated with a metal thin film made of, for example, aluminum, chromium, silver, or gold, electrically conductive metal oxide thin film made of, for example, indium oxide, tin oxide, or zinc oxide, or a thin layer of an electrically conductive ink containing silver nanowires.

The support member may be subjected to surface treatment by electrochemical operation such as anodization, or wet honing, blast or cutting to improve the electrical properties and suppress the occurrence of interference fringes.

The support member may be in the form of a cylinder, a belt, a film, or the like.

Electroconductive Layer

An electroconductive layer may be disposed on the support member. The average thickness of the electroconductive layer may be in the range of 0.2 μm to 40 μm, such as 1 μm to 35 μm or 5 μm to 30 μm.

The electroconductive layer may contain metal oxide particles and a binder resin. Examples of the metal oxide of the metal oxide particles include zinc oxide, white lead, aluminum oxide, indium oxide, silicon oxide, zirconium oxide, tin oxide, titanium oxide, magnesium oxide, antimony oxide, bismuth oxide, tin-doped indium oxide, and antimony- or tantalum-doped tin oxide or zirconium oxide. Particles of zinc oxide, titanium oxide, or tin oxide are advantageous. The number average particle size of the metal oxide particles may be in the range of 30 nm to 450 nm, such as in the range of 30 nm to 250 nm, from the viewpoint of preventing local formation of conductive paths that is a cause of black points.

The binder resin may be a polyester resin, a polycarbonate resin, a polyvinyl butyral resin, an acrylic resin, a silicone resin, an epoxy resin, a melamine resin, a urethane resin, a phenol resin, or an alkyd resin.

The electroconductive layer may be formed by applying a coating liquid prepared for the electroconductive layer onto the support member. The coating liquid for the electroconductive layer may contain a solvent in addition to the metal oxide particles and the binder resin. This solvent may be an alcohol-based solvent, a sulfoxide-based solvent, a ketone-based solvent, an ether-based solvent, an ester-based solvent, or an aromatic hydrocarbon. The metal oxide particles are dispersed in the coating liquid by using, for example, a paint shaker, a sand mill, a ball mill, or a high-speed liquid collision disperser. The metal oxide particles may be surface-treated with a silane coupling agent or the like so as to be highly dispersed. Also, the metal oxide particles may be doped with another metal or metal oxide to regulate the resistance of the electroconductive layer.

Undercoat Layer

An undercoat layer may be disposed on the support member or the electroconductive layer. The undercoat layer acts as a barrier and enhances adhesion. The average thickness of the undercoat layer may be in the range of 0.05 μm to 40 μm, such as 0.05 μm to 7 μm or 0.1 μm to 2 μm.

It is advantageous for preventing charges generated from the charge generating layer from staying there that the undercoat layer contain an electron transporting material and a binder resin. Such an undercoat layer allows the electrons of the charges generated from the charge generating layer to be transported to the support member. Consequently, charge deactivation during generation of charges and trap increase can be suppressed even if the charge transport ability is increased. Thus, electrical properties at the beginning and during repeated use are improved.

Examples of the electron transporting material include quinone compounds, imide compounds, benzimidazole compounds, cyclopentadienylidene compounds, fluorenone compounds, xanthone-based compounds, benzophenone-based compounds, cyanovinyl-based compounds, naphthylimide compounds, and peryleneimide compounds. The electron transporting material may have a polymerizable functional group, such as hydroxy, thiol, amino, carboxy, or methoxy.

Examples of the binder resin include polyacrylic acid-based resin, methyl cellulose, ethyl cellulose, polyamide resin, polyimide resin, poly(amide-imide) resin, polyamide acid resin, urethane resin, melamine resin, and epoxy resin. Alternatively, the binder resin may be a polymer having a cross-linked structure formed by thermally polymerizing (curing) a thermosetting resin having a polymerizable functional group, such as acetal resin or alkyd resin, and a monomer having a polymerizable functional group, such as an isocyanate compound.

The undercoat layer can be formed by applying a coating liquid for forming the undercoat layer containing a binder resin, and drying the coating.

Photosensitive Layer (1) Multilayer Photosensitive Layer

If the photosensitive layer has a multilayer structure, the electrophotographic photosensitive member includes a charge generating layer containing a charge generating material, and a charge transport layer containing a charge transporting material.

(1-1) Charge Generating Layer

The average thickness of the charge generating layer may be in the range of 0.05 μm to 5 μm, such as 0.05 μm to 1 μm or 0.1 μm to 0.3 μm.

Examples of the charge generating material include azo pigments, perylene pigments, anthraquinone derivatives, anthanthrone derivatives, dibenzpyrenequinone derivatives, pyranthrone derivatives, violanthrone derivatives, isoviolanthrone derivatives, indigo derivatives, thioindigo derivatives, phthalocyanine pigments, and bisbenzimidazole derivatives. Among these, azo pigments and phthalocyanine pigments are advantageous. Advantageous phthalocyanine pigments include oxytitanium phthalocyanine, chlorogallium phthalocyanine, and hydroxygallium phthalocyanine.

The charge generating layer also contains a binder resin. Examples of the binder resin include polymers or copolymers of vinyl compounds, such as styrene, vinyl acetate, vinyl chloride, acrylic acid esters, methacrylic acid esters, vinylidene fluoride, and trifluoroethylene; and polyvinyl alcohol resin, polyvinyl acetal resin, polycarbonate resin, polyester resin, polysulfone resin, polyphenylene oxide resin, polyurethane resin, cellulose resin, phenol resin, melamine resin, silicone resin, and epoxy resin. Among these, polyester resin, polycarbonate resin, and polyvinyl acetal resin are advantageous. Polyvinyl acetal resin is particularly advantageous.

The charge generating material content in the charge generating layer is desirably in the range of 30% by mass to 90% by mass, such as in the range of 50% by mass to 80% by mass, relative to the total mass of the charge generating layer.

In the charge generating layer, the mass ratio of the charge generating material to the binder resin (mass of the charge generating material/mass of the binder resin) may be in the range of 10/1 to 1/10, such as 5/1 to 1/5.

The charge generating layer may be formed by applying a coating liquid for the charge generating layer prepared by mixing a charge generating material and a binder resin with a solvent, and drying the coating. The solvent used in the coating liquid for the charge generating layer may be an alcohol-based solvent, a sulfoxide-based solvent, a ketone-based solvent, an ether-based solvent, an ester-based solvent, or an aromatic hydrocarbon.

(1-2) Charge Transport Layer

The thickness of the charge transport layer may be in the range of 5 μm to 50 μm, such as in the range of 10 μm to 35 μm.

Examples of the charge transporting material in the charge transport layer include polycyclic aromatic compounds, heterocyclic compounds, hydrazone compounds, styryl compounds, enamines, benzidine compounds, triarylamine compounds, and triphenylamine. Alternatively, the charge transporting material may be a polymer having a group derived from these compounds in the main chain or a side chain. Triarylamine compounds and benzidine compounds are advantageous in terms of potential stability during repeated use. A plurality of charge transporting materials may be used in combination. The following are exemplary charge transporting materials.

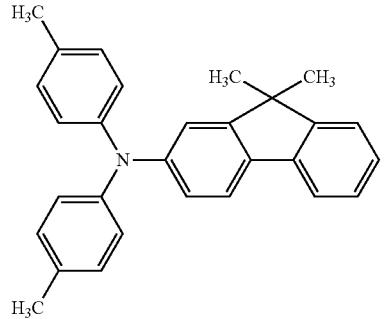

(CTM-1)

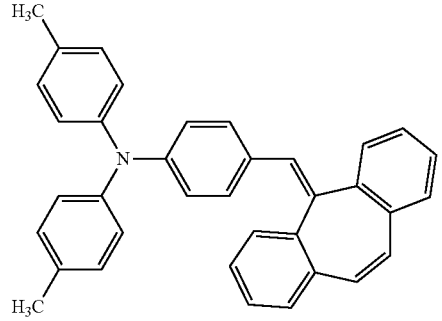

(CTM-2)

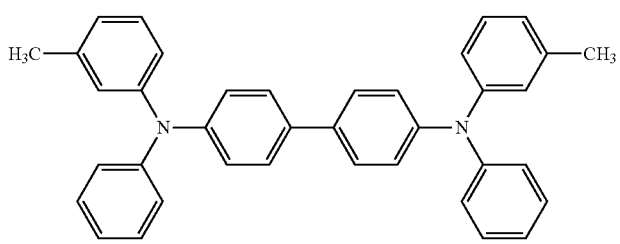

(CTM-3)

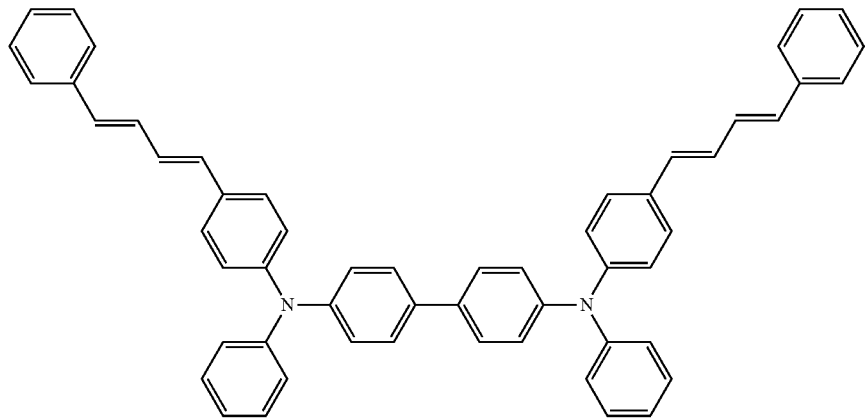
(CTM-4)
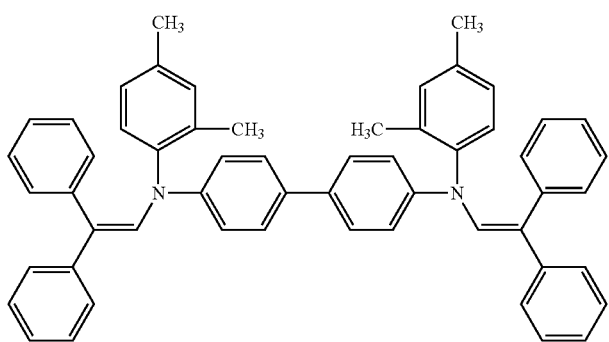
(CTM-5)
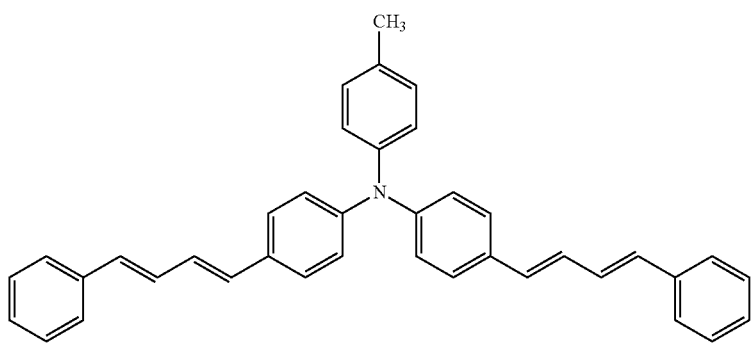
(CTM-6)

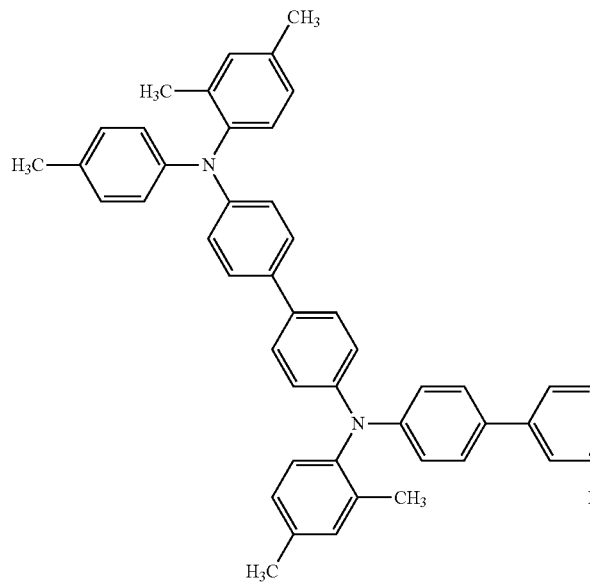
(CTM-7)

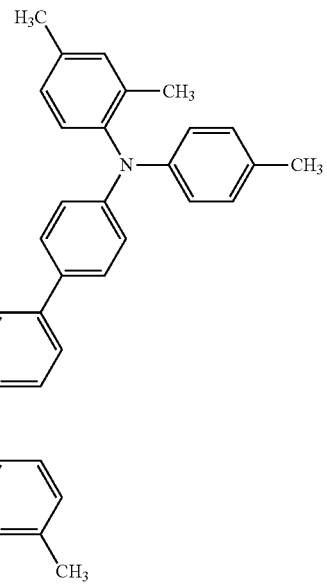

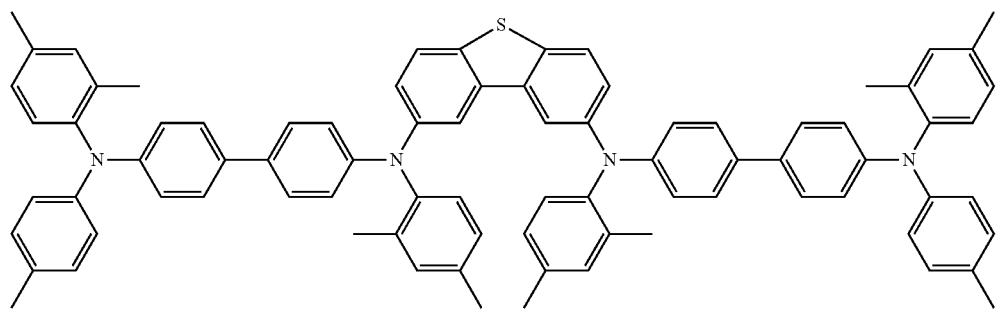
(CTM-8)

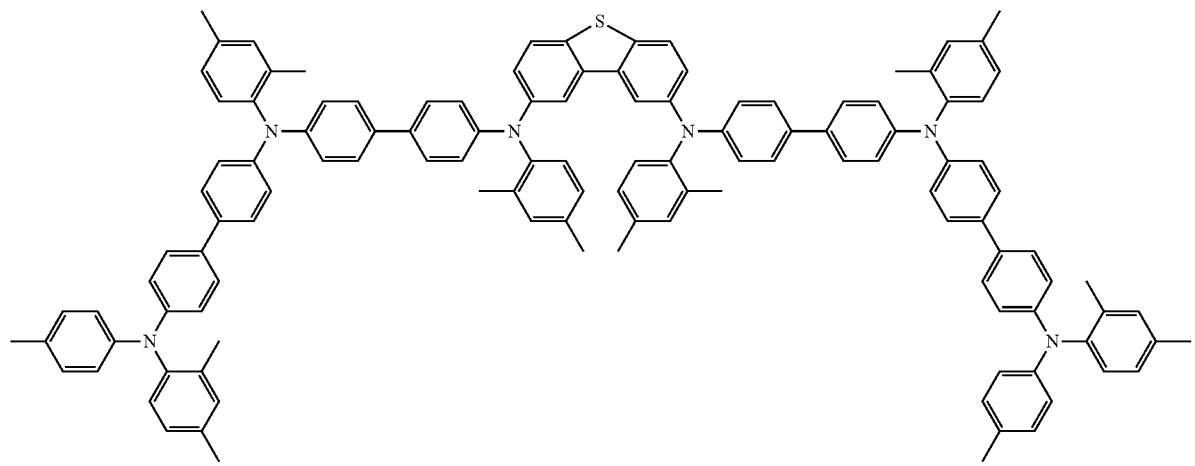
(CTM-9)

The binder resin used in the charge transport layer may be polyester, acrylic resin, phenoxy resin, polycarbonate, polystyrene, polyvinyl acetate, polysulfone, polyarylate, vinylidene chloride, and acrylonitrile copolymer. Among these, polycarbonate and polyarylate are advantageous.

The charge transporting material content in the charge transport layer is desirably in the range of 20% by mass to 80% by mass, such as in the range of 30% by mass to 60% by mass, relative to the total mass of the charge transport layer.

The charge transport layer may be formed by applying a coating liquid for the charge transport layer prepared by dissolving a charge transporting material and a binder resin in a solvent, and drying the coating. The solvent used in the coating liquid for forming the charge transport layer may be an alcohol-based solvent, a sulfoxide-based solvent, a ketone-based solvent, an ether-based solvent, an ester-based solvent, or an aromatic hydrocarbon.

(2) Single-Layer Photosensitive Layer

If the photosensitive layer has a single-layer structure, the photosensitive layer contains a charge generating material and a charge transporting material. The photosensitive layer may be formed by applying a coating liquid for the photosensitive layer prepared by dissolving the charge generating material, the charge transporting material, and a binder resin in a solvent, and drying the coating. The charge transporting material and the binder resin may be selected from among the same materials cited in "(1) Multilayer Photosensitive Layer".

Protective Layer

The photosensitive layer may be covered with a protective layer. The protective layer may contain electrically conductive particles or a charge transporting material and a binder resin. The protective layer may further contain an additive, such as a lubricant. The binder resin in the protective layer may have electrical conductivity or charge transporting ability. In this instance, electrically conductive particles or a charge transporting material need not be added to the protective layer. The binder resin in the protective layer may be thermoplastic, or may be a resin cured by heat, light, or radiation (e.g. electron beam).

Process Cartridge and Electrophotographic Apparatus

The process cartridge according to an embodiment of the present disclosure is removably mounted to an electrophotographic apparatus and includes the above-described electrophotographic photosensitive member and at least one device selected from the group consisting of a charging device, a developing device, a transfer device, and a cleaning device. The electrophotographic photosensitive member and these devices are held in one body.

Also, the electrophotographic apparatus according to an embodiment of the present disclosure includes the above-described electrophotographic photosensitive member, a charging device, an exposure device, a developing device, and a transfer device.

FIG. 1 is a schematic view of the structure of an electrophotographic apparatus provided with a process cartridge including an electrophotographic photosensitive member.

This electrophotographic photosensitive member 1 is driven for rotation on an axis 2 in the direction indicated by an arrow at a predetermined peripheral speed. The surface (periphery) of the electrophotographic photosensitive member 1 driven for rotation is uniformly charged to a predetermined positive or negative potential by a charging device 3 (primary charging device such as charging roller). Then, the surface or periphery is subjected to exposure (image exposure) 4 from an exposure device (not shown), such as a slit exposure or laser beam scanning exposure device. Thus electrostatic latent images corresponding to desired images are formed one after another on the surface of the electrophotographic photosensitive member 1.

The electrostatic latent images formed on the surface of the electrophotographic photosensitive member 1 are then developed into toner images with the toner contained in the developer of the developing device 5. Subsequently, the toner images on the surface of the electrophotographic photosensitive member 1 are transferred to a transfer medium P, such as a paper sheet, one after another from a transfer device 6, such as a transfer roller. The toner images on the surface of the electrophotographic photosensitive member 1 may be transferred once to an intermediate transfer medium and then to the transfer medium such as a paper sheet. The transfer medium P is fed to an abutting portion between the electrophotographic photosensitive member 1 and the transfer device 6 from a transfer medium feeder (not shown) in synchronization with the rotation of the electrophotographic photosensitive member 1.

The transfer medium P to which the toner images have been transferred is separated from the surface of the electrophotographic photosensitive member 1 and introduced into a fixing device 8, in which the toner images are fixed, thus being ejected as an image-formed article (printed material or copy).

The surface of the electrophotographic photosensitive member 1 after the toner images have been transferred is cleaned with a cleaning device 7, such as a cleaning blade, to remove therefrom the developer (toner) remaining after transfer. Subsequently, the electrophotographic photosensitive member 1 is subjected to pre-exposure (not shown) with the exposure device (not shown) to remove static electricity before being reused to form images. If the charging device 3 is of contact charging type, such as a charging roller as shown in FIG. 1, however, pre-exposure is not necessarily required.

Some of the components of the electrophotographic apparatus including the electrophotographic photosensitive member 1, the charging device 3, the developing device 5, the transfer device 6, and the cleaning device 7 may be combined in a single container as an integrated process cartridge. The process cartridge may be removably mounted to an electrophotographic apparatus such as a copy machine or a laser beam printer. In the embodiment shown in FIG. 1, the electrophotographic photosensitive member 1, the charging device 3, the developing device 5, and the cleaning device 7 are integrated into a cartridge. The cartridge is guided by a guide 10 such as a rail of the electrophotographic apparatus body, thus being used as a removable process cartridge 9 in the electrophotographic apparatus.

EXAMPLES

The subject matter of the present disclosure will be further described in detail with reference to Examples and Comparative Examples. The subject matter is however not limited to the following Examples. In the following Examples, "part(s)" is on a mass basis unless otherwise specified.

Synthesis of Polyester Resin

Synthesis Example 1: Synthesis of Polyester Resin A

An acid halide solution was prepared by dissolving dicarboxylic acid halides in dichloromethane. The dicarboxylic acid halides were:

15.2 g of the dicarboxylic acid halide represented by the following formula:

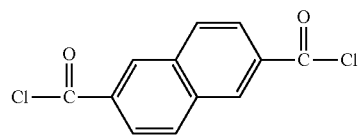 [SMILES: O=C(Cl)c1ccc2cc(C(=O)Cl)ccc2c1]

and 41.3 g of the dicarboxylic acid halide represented by the following formula:

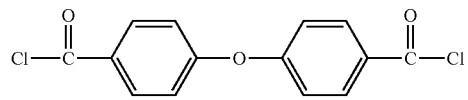 [SMILES: O=C(Cl)c1ccc(Oc2ccc(C(=O)Cl)cc2)cc1]

Also, a diol compound solution was prepared by dissolving 51.2 g of a diol in 10% aqueous solution of sodium hydroxide and stirring the solution in the presence of tributylbenzylammonium chloride added as a polymerization catalyst. The diol is represented by the following formula:

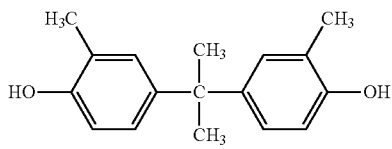 [SMILES: Cc1cc(C(C)(C)c2ccc(O)c(C)c2)ccc1O]

Then, the acid halide solution was added to the diol compound solution with stirring to start a polymerization. The polymerization was made at a reaction temperature kept at 25° C. or less for 3 hours with stirring. During the polymerization reaction, p-tert-butylphenol was added as a polymerization regulator. Then, acetic acid was added to terminate the polymerization reaction, and the reaction solution was repeatedly washed with water until the aqueous phase was turned neutral. After washing, the dichloromethane phase was dropped into methanol to precipitate the polymerization product. The polymerization product was vacuum-dried to yield 74.9 g of polyester resin A. The resulting polyester resin A had the structure represented by formula (I-1), the structure represented by formula (I-2), and the structure represented by formula (II-1) that is one of the structures represented by general formula (II). The weight average molecular weight of polyester resin A was 100,000.

Synthesis Example 2: Synthesis of Polyester Resin B

Diols were dissolved in 10% aqueous solution of sodium hydroxide. The diols were:
29.0 g of the diol represented by the following formula:

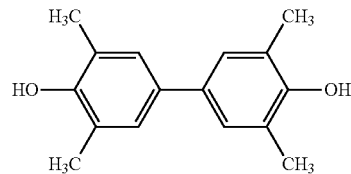

and 23.2 g of the diol represented by the following formula:

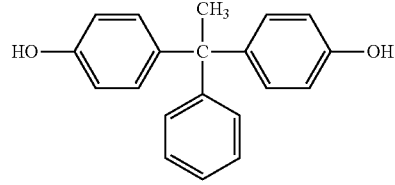 [SMILES: CC(c1ccccc1)(c1ccc(O)cc1)c1ccc(O)cc1]

To this solution, tributylbenzylammonium chloride was added as a polymerization catalyst to yield a diol compound solution.

Then, the acid halide solution prepared in the same manner as in Synthesis Example 1 was added to the diol compound solution with stirring to start a polymerization. The polymerization was made at a reaction temperature kept at 25° C. or less for 3 hours with stirring. During the polymerization reaction, p-tert-butylphenol was added as a polymerization regulator. Then, acetic acid was added to terminate the polymerization reaction, and the reaction solution was repeatedly washed with water until the aqueous phase was turned neutral. After washing, the dichloromethane phase was dropped into methanol to precipitate the polymerization product. The polymerization product was vacuum-dried to yield 76.2 g of polyester resin B. The resulting polyester resin B had the structure represented by formula (I-1), the structure represented by formula (I-2), and the structures represented by formulas (II-7) and (II-8) that are each one of the structures represented by general formula (II). The weight average molecular weight of polyester resin B was 90,000.

Synthesis Examples 3 to 22

Polyester resins C to R and CE-1 to CE-4, each shown in Table 1, were synthesized in the same manner as in Synthesis Example 1 or 2.

TABLE 1

| | | Polyester Resin Synthesis Examples | | | | |
|---|---|---|---|---|---|---|
| | | Structures (type and mole percent) | | | | |
| | | Structure of general formula (I)[1] | | Structure of general formula (II)[2] | | |
| Synthesis Example No. | Polyester resin No. | Formula (I-1) (mol %) | Formula (I-2) (mol %) | Formula type | Percent by mole (mol %) | Weight average molecular weight of polyester resin |
| Synthesis Example 1 | A | 30 | 70 | II-1 | 100 | 100,000 |
| Synthesis Example 2 | B | 30 | 70 | II-7/II-8 | 40/60 | 90,000 |
| Synthesis Example 3 | C | 30 | 70 | II-5/II-8 | 40/60 | 90,000 |
| Synthesis Example 4 | D | 25 | 75 | II-6/II-8 | 40/60 | 120,000 |

TABLE 1-continued

Polyester Resin Synthesis Examples

| | | Structures (type and mole percent) | | | | |
|---|---|---|---|---|---|---|
| | | Structure of general formula (I)*1 | | Structure of general formula (II)*2 | | |
| Synthesis Example No. | Polyester resin No. | Formula (I-1) (mol %) | Formula (I-2) (mol %) | Formula type | Percent by mole (mol %) | Weight average molecular weight of polyester resin |
| Synthesis Example 5 | E | 30 | 70 | II-8/II-15 | 60/40 | 100,000 |
| Synthesis Example 6 | F | 40 | 60 | II-8/II-16 | 50/50 | 110,000 |
| Synthesis Example 7 | G | 75 | 25 | II-7 | 100 | 80,000 |
| Synthesis Example 8 | H | 50 | 50 | II-5 | 100 | 140,000 |
| Synthesis Example 9 | I | 40 | 60 | II-15 | 100 | 180,000 |
| Synthesis Example 10 | J | 30 | 70 | II-2/II-3 | 80/20 | 80,000 |
| Synthesis Example 11 | K | 40 | 60 | II-4/11-13 | 50/50 | 110,000 |
| Synthesis Example 12 | L | 60 | 40 | II-9 | 100 | 90,000 |
| Synthesis Example 13 | M | 30 | 70 | II-5/II-10 | 40/60 | 130,000 |
| Synthesis Example 14 | N | 30 | 70 | II-10/II-15 | 60/40 | 120,000 |
| Synthesis Example 15 | O | 20 | 80 | II-11/II-13 | 20/80 | 80,000 |
| Synthesis Example 16 | P | 30 | 70 | II-5/II-12 | 50/50 | 110,000 |
| Synthesis Example 17 | Q | 30 | 70 | II-14 | 100 | 140,000 |
| Synthesis Example 18 | R | 30 | 70 | II-17 | 100 | 80,000 |
| Synthesis Example 19 | CE-1 | — | 100 | II-1 | 100 | 90,000 |
| Synthesis Example 20 | CE-2 | — | 100 | II-2/II-3 | 80/20 | 120,000 |
| Synthesis Example 21 | CE-3 | — | 100 | II-11/II-13 | 20/80 | 80,000 |
| Synthesis Example 22 | CE-4 | — | 100 | II-6/II-8 | 40/60 | 80,000 |

*1Percentage of the moles of the corresponding structure to the moles of the structures represented by general formula (II) (mol %).
*2Percentage of the moles of the corresponding structure to the moles of the structures represented by general formula (I) (mol %).

Synthesis Example 23

Polyester resin CE-5 was synthesized in the same manner as in Synthesis Example 1 or 2. The resulting polyester resin CE-5 had:
the structure represented by formula (I-1);
the structure represented by the following formula:

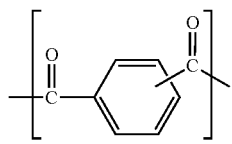

the structure represented by formula (II-12) that is one of the structures represented by general formula (II); and
the structure represented by the following formula:

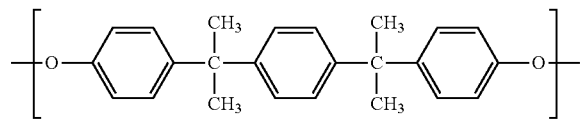

The percentages by mole of these structures were 10/40/25/25. The weight average molecular weight of polyester resin CE-5 was 100,000.

In Table 1, the weight average molecular weight of each resin is the polystyrene equivalent weight average molecular weight (Mw).

The proportion or percentage of each structure in the polyester resin can be determined by a conventional analytical method. The proportion of the polyester resin concerned to the total mass of the resins in the surface layer can also be determined by a conventional analytical method. An exemplary analytical method will be described below.

First, the surface layer of the electrophotographic photosensitive member is dissolved in a solvent. Subsequently, the constituents of the surface layer are separated and collected by a size exclusion chromatograph, a high-performance liquid chromatograph, or any other apparatus that can separate and collect the constituents. The polyester resin thus separated and collected was subjected to nuclear magnetic resonance analysis and mass spectroscopy for calculating the number of repetitions and the mole percentage of each structure.

Alternatively, the polyester resin may be hydrolyzed into a carboxylic acid portion and a bisphenol portion, for example, in the presence of an alkali. The bisphenol portion thus obtained was subjected to nuclear magnetic resonance analysis and mass spectroscopy for calculating the number of repetitions and the mole percentage of the structure.

Preparation of Electrophotographic Photosensitive Member

Example 1

An aluminum cylinder of 30 mm in diameter and 357.5 mm in length was used as a support member (electrically conductive support member). Next, 10 parts of $SnO_2$-coated barium sulfate particles (electrically conductive particles), 2 parts of titanium oxide (pigment for regulating resistance), 6 parts of phenol resin, and 0.001 part of silicone oil (leveling agent) were added to a mixed solvent of 4 parts of methanol and 16 parts of methoxypropanol to yield a coating liquid for forming an electroconductive layer.

This coating liquid was applied onto the surface of the aluminum cylinder by dipping. The resulting coating film was cured by heating at 140° C. for 30 minutes to yield a 20 μm thick electroconductive layer.

Subsequently, 3 parts of an N-methoxymethylated nylon and 3 parts of a copolymerized nylon were dissolved in a mixed solvent of 65 parts of methanol and 30 parts of n-butanol to yield a coating liquid for forming an undercoat layer.

This coating liquid for the undercoat layer was applied onto the surface of the electroconductive layer by dipping. The resulting coating film was dried at 100° C. for 10 minutes to yield a 0.8 μm thick undercoat layer.

Subsequently, 10 parts of a crystalline hydroxygallium phthalocyanine (charge generating material) whose CuKα X-ray diffraction spectrum has peaks at Bragg angles 2θ (±0.2°) of 7.5°, 9.9°, 16.3°, 18.6°, 25.1° and 28.3° was prepared. This crystalline hydroxygallium phthalocyanine was added to a liquid prepared by dissolving 5 parts of a polyvinyl butyral resin (product name: S-LEC BX-1, produced by Sekisui Chemical) in 250 parts of cyclohexanone, and the materials were dispersed in each other in a sand mill containing glass beads of 1 mm in diameter at 23° C.±3° C. for 1 hour. After dispersion, 250 parts of ethyl acetate was added to the dispersion liquid to yield a coating liquid for forming a charge generating layer.

The coating liquid for the charge generating layer was applied onto the surface of the undercoat layer by dipping. The resulting coating film was dried at 100° C. for 10 minutes to yield a 0.30 μm thick charge generating layer.

Subsequently, 7.2 parts of the compound (charge transporting material) represented by formula (CTM-1), 0.8 part of the compound (charge transporting material) represented by formula (CTM-3), and 10 parts of polyester resin A synthesized in Synthesis Example 1 were dissolved in a mixed solvent of 33 parts of dimethoxymethane and 49 parts of cyclopentanone to yield a coating liquid for forming a charge transport layer.

The coating liquid for the charge transport layer was applied onto the surface of the charge generating layer by dipping. The resulting coating film was dried at 130° C. for 30 minutes to yield an 18 μm thick charge transport layer (surface layer).

Thus, an electrophotographic photosensitive member was prepared which includes the support member, the electroconductive layer, the undercoat layer, the charge generating layer, and the charge transport layer in that order.

Examples 2 to 36, Comparative Examples 1 to 5

Electrophotographic photosensitive member samples were prepared in the same manner as in Example 1, except that the polyester resin and the charge transporting material were replaced as shown in Table 2.

Evaluation

The resulting electrophotographic photosensitive member was installed into a copy machine iR ADVANCE 4245 manufactured by Canon, and the copy machine was modified so that the electrophotographic photosensitive member would have a charged potential (dark portion potential) of −700 V and a light portion potential of −120 V. The samples were tested for evaluation at a temperature of 25° C. and a relative humidity of 55%.

Durability

Under this environment, 50,000 sheets were fed for making copies of an original pattern with an image density of 5%. Then, the electrophotographic photosensitive member was removed from the copy machine, and the surface roughness of the charge transport layer was measured with a surface roughness measuring system (SURFCORDER SE-3400, manufactured by Kosaka Laboratory). The results were converted to ten-point surface roughness Rzjis (measurement length: 10 mm) specified in JIS B 0601: 2001.

Image Quality

Under the above-mentioned test environment, 50,000 sheets were fed for making copies of an original pattern with an image density of 5%. The images of the resulting copies were evaluated under the following criteria:

Good: No black streak formed by a flaw was observed throughout the surface.

Bad: One or more black streaks formed by a flaw were observed in a portion.

Example 37

An aluminum cylinder of 24 mm in diameter and 257 mm in length was used as a support member (electrically conductive support member). Next, 10 parts of $SnO_2$-coated barium sulfate particles (electrically conductive particles), 2 parts of titanium oxide (pigment for regulating resistance), 6 parts of phenol resin, and 0.001 part of silicone oil (leveling agent) were added to a mixed solvent of 4 parts of methanol and 16 parts of methoxypropanol to yield a coating liquid for forming an electroconductive layer.

This coating liquid was applied onto the surface of the aluminum cylinder by dipping. The resulting coating film was cured by heating at 140° C. for 30 minutes to yield a 20 µm thick electroconductive layer.

Subsequently, 3 parts of an N-methoxymethylated nylon and 3 parts of a copolymerized nylon were dissolved in a

TABLE 2

Preparation Conditions and Test Results of Electrophotographic Members

| | Preparation conditions | | | Test results | |
|---|---|---|---|---|---|
| Example No. | Charge transport material and mass ratio | Polyester resin No. | Charge transport material/ resin mass ratio | Durability: $Rz_{jis}$ (µm) | Image quality |
| Example 1 | (CTM-1)/(CTM-3)(9/1) | A | 8/10 | 2.5 | Good |
| Example 2 | (CTM-1)/(CTM-2)(9/1) | B | 8/10 | 2.1 | Good |
| Example 3 | (CTM-1)/(CTM-2)(9/1) | C | 8/10 | 1.8 | Good |
| Example 4 | (CTM-1)/(CTM-2)(9/1) | D | 8/10 | 1.8 | Good |
| Example 5 | (CTM-1)/(CTM-2)(9/1) | E | 8/10 | 1.9 | Good |
| Example 6 | (CTM-1)/(CTM-3)(8/2) | F | 8/10 | 2.2 | Good |
| Example 7 | (CTM-1)/(CTM-2)(9/1) | G | 8/10 | 2.8 | Good |
| Example 8 | (CTM-1)/(CTM-2)(9/1) | H | 8/10 | 2.2 | Good |
| Example 9 | (CTM-1)/(CTM-2)(9/1) | I | 8/10 | 2.3 | Good |
| Example 10 | (CTM-1)/(CTM-3)(8/2) | J | 8/10 | 2.6 | Good |
| Example 11 | (CTM-1)/(CTM-3)(8/2) | K | 8/10 | 2.4 | Good |
| Example 12 | (CTM-1)/(CTM-2)(9/1) | L | 8/10 | 2.0 | Good |
| Example 13 | (CTM-1)/(CTM-2)(9/1) | M | 8/10 | 1.8 | Good |
| Example 14 | (CTM-1)/(CTM-2)(9/1) | N | 8/10 | 1.8 | Good |
| Example 15 | (CTM-1)/(CTM-3)(8/2) | O | 8/10 | 3.0 | Good |
| Example 16 | (CTM-1)/(CTM-2)(9/1) | P | 8/10 | 2.0 | Good |
| Example 17 | (CTM-1)/(CTM-3)(8/2) | Q | 8/10 | 2.6 | Good |
| Example 18 | (CTM-1)/(CTM-3)(8/2) | R | 8/10 | 2.7 | Good |
| Example 19 | (CTM-4) | K | 5/10 | 2.2 | Good |
| Example 20 | (CTM-4) | H | 4/10 | 2.0 | Good |
| Example 21 | (CTM-5) | I | 4/10 | 2.1 | Good |
| Example 22 | (CTM-6) | A | 6/10 | 2.2 | Good |
| Example 23 | (CTM-7) | B | 6/10 | 1.5 | Good |
| Example 24 | (CTM-7) | C | 6/10 | 1.4 | Good |
| Example 25 | (CTM-7) | D | 6/10 | 1.4 | Good |
| Example 26 | (CTM-7) | E | 6/10 | 1.5 | Good |
| Example 27 | (CTM-7) | H | 6/10 | 1.7 | Good |
| Example 28 | (CTM-7) | I | 6/10 | 1.8 | Good |
| Example 29 | (CTM-8) | B | 6/10 | 1.5 | Good |
| Example 30 | (CTM-8) | C | 6/10 | 1.5 | Good |
| Example 31 | (CTM-8) | D | 6/10 | 1.6 | Good |
| Example 32 | (CTM-8) | E | 6/10 | 1.6 | Good |
| Example 33 | (CTM-9) | B | 4/10 | 1.2 | Good |
| Example 34 | (CTM-9) | C | 4/10 | 1.2 | Good |
| Example 35 | (CTM-9) | D | 4/10 | 1.3 | Good |
| Example 36 | (CTM-9) | E | 4/10 | 1.3 | Good |
| Comparative Example 1 | (CTM-1)/(CTM-2)(9/1) | CE-1 | 8/10 | 3.8 | Bad |
| Comparative Example 2 | (CTM-1)/(CTM-2)(9/1) | CE-2 | 8/10 | 4.0 | Bad |
| Comparative Example 3 | (CTM-1)/(CTM-2)(9/1) | CE-3 | 8/10 | 3.9 | Bad |
| Comparative Example 4 | (CTM-1)/(CTM-2)(9/1) | CE-4 | 8/10 | 3.8 | Bad |
| Comparative Example 5 | (CTM-1)/(CTM-2)(9/1) | CE-5 | 8/10 | 4.6 | Bad | mixed solvent of 65 parts of methanol and 30 parts of n-butanol to yield a coating liquid for forming an undercoat layer.

This coating liquid for the undercoat layer was applied onto the surface of the electroconductive layer by dipping. The resulting coating film was dried at 100° C. for 10 minutes to yield a 0.8 μm thick undercoat layer.

Subsequently, 10 parts of a crystalline hydroxygallium phthalocyanine (charge generating material) whose CuKα X-ray diffraction spectrum has peaks at Bragg angles 2θ (±0.2°) of 7.5°, 9.9°, 16.3°, 18.6°, 25.1° and 28.3° was prepared. This crystalline hydroxygallium phthalocyanine was added to a liquid prepared by dissolving 5 parts of a polyvinyl butyral resin (product name: S-LEC BX-1, produced by Sekisui Chemical) in 250 parts of cyclohexanone, and the materials were dispersed in each other in a sand mill containing glass beads of 1 mm in diameter at 23° C.±3° C. for 1 hour. After dispersion, 250 parts of ethyl acetate was added to the dispersion liquid to yield a coating liquid for forming a charge generating layer.

The coating liquid for the charge generating layer was applied onto the surface of the undercoat layer by dipping. The resulting coating film was dried at 100° C. for 10 minutes to yield a 0.30 μm thick charge generating layer.

Subsequently, 7.2 parts of the compound (charge transporting material) represented by formula (CTM-1), 0.8 part of the compound (charge transporting material) represented by formula (CTM-2), and 10 parts of polyester resin B were dissolved in a mixed solvent of 33 parts of dimethoxymethane and 49 parts of cyclopentanone to yield a coating liquid for forming a charge transport layer.

The coating liquid for the charge transport layer was applied onto the surface of the charge generating layer by dipping. The resulting coating film was dried at 130° C. for 30 minutes to yield a 14 μm thick charge transport layer (surface layer).

Thus, an electrophotographic photosensitive member was prepared which includes the support member, the electroconductive layer, the undercoat layer, the charge generating layer, and the charge transport layer in that order.

Examples 38 to 43

Electrophotographic photosensitive member samples were prepared in the same manner as in Example 37, except that the polyester resin was replaced as shown in Table 3.

Example 44

An electrophotographic photosensitive member was prepared in the same manner as in Example 37, except that the polyester resin was replaced with the combination of 7 parts of polyester resin B and 3 parts of a polycarbonate resin (viscosity average molecular weight: 40,000) having the structure represented by the following formula:

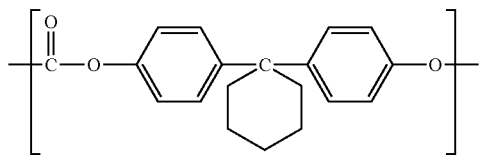

Examples 45 to 47

Electrophotographic photosensitive member samples were prepared in the same manner as in Example 44, except that the polyester resin was replaced as shown in Table 3.

Example 48

An electrophotographic photosensitive member was prepared in the same manner as in Example 37, except that the polyester resin was replaced with the combination of:
5 parts of polyester resin B, and
5 parts of a polyester resin (Mw=120,000) having the structure represented by the following formula and the structure represented by formula (II-1) with a proportion of 50/50 (percent by mole).

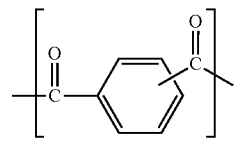

Examples 49 to 51

Electrophotographic photosensitive member samples were prepared in the same manner as in Example 44, except that the polyester resin was replaced as shown in Table 3.
Evaluation
Durability The resulting electrophotographic photosensitive member samples were each installed into a laser beam printer Color Laser JET CP4525dn manufactured by Hewlett-Packard. The samples were tested for evaluation at a temperature of 25° C. and a relative humidity of 55%.

Under this test environment, 20,000 sheets were fed for printing a pattern with an image density of 5%. Then, the electrophotographic photosensitive member was removed from the printer, and the surface roughness of the charge transport layer was measured with a surface roughness measuring system (SURFCORDER SE-3400, manufactured by Kosaka Laboratory). The results were converted to ten-point surface roughness Rzjis (measurement length: 10 mm) specified in JIS B 0601: 2001.
Charge Mobility Charge mobility was measured with a voltage direct application type electrophotographic photosensitive member measuring apparatus using a curved ITO NESA glass.

More specifically, the surface of the electrophotographic photosensitive member was brought into close contact with the NESA glass. Then, a voltage was applied to the NESA glass to charge the electrophotographic photosensitive member to a predetermined surface potential (Vd: −700 V). After the charge was kept for 0.5 second, the voltage applied to the NESA glass was turned off, and the electrophotographic photosensitive member was subjected to directly exposure. The exposure dose was controlled so that the surface potential (Vl) 0.1 second after exposure would be −500 V.

Figure 2:
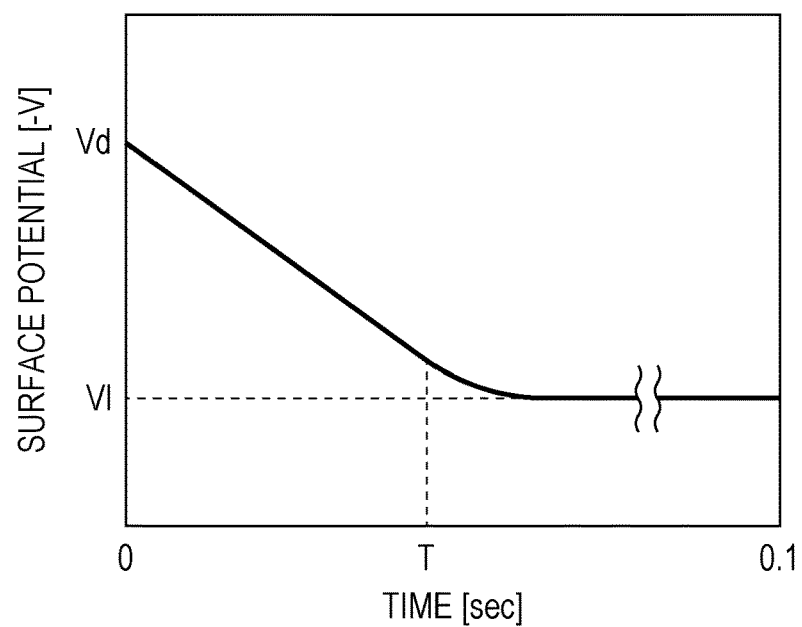
FIG. 2 is a plot of the changes in potential at the surface of an electrophotographic photosensitive member in a charge mobility test.

FIG. 2 is a plot of changes in potential at the surface of an electrophotographic photosensitive member in this test. The period immediately after exposure during which the potential was changing linearly was calculated from the plot shown in FIG. 2 and was defined as charge transport time T. Using the charge transport time T, the thickness d of the charge transport layer, and the surface potential Vd set at the beginning of the measurement, charge mobility μ (cm²/Vs) was calculated from the equation μ=d2/(Vd·T).

TABLE 3

Preparation Conditions and Test Results of Electrophotographic Members

| Example No. | Preparation conditions Polyester No. | Test results Durability: Rz$_{jis}$ (μm) | Charge mobility cm²/Vs (×10⁻⁶) |
|---|---|---|---|
| Example 37 | B | 1.1 | 5.4 |
| Example 38 | C | 0.9 | 6.5 |
| Example 39 | D | 0.9 | 5.6 |
| Example 40 | E | 1.0 | 6.2 |
| Example 41 | A | 1.2 | 6.8 |
| Example 42 | J | 1.2 | 4.3 |
| Example 43 | O | 1.4 | 2.5 |
| Example 44 | B | 1.6 | 5.6 |
| Example 45 | C | 1.4 | 6.6 |
| Example 46 | D | 1.4 | 5.4 |
| Example 47 | E | 1.5 | 6.2 |
| Example 48 | B | 1.2 | 4.0 |
| Example 49 | C | 1.1 | 5.3 |
| Example 50 | D | 1.1 | 3.8 |
| Example 51 | E | 1.2 | 5.0 |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-030169 filed Feb. 19, 2016, which is hereby incorporated by reference herein in its entirety.

What is claimed is:

1. An electrophotographic photosensitive member comprising a surface layer containing a polyester resin having structures represented by general formula (I) and a structure represented by general formula (II):

(I)

wherein in general formula (I), X¹ represents a divalent group; and

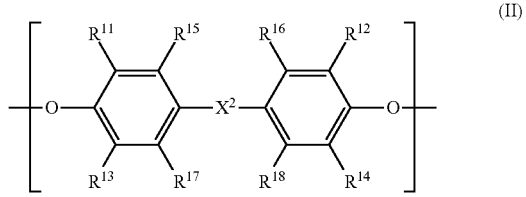
(II)

wherein in general formula (II), X² represents one selected from the group consisting of a single bond, an oxygen atom, a divalent alkylene group, and a divalent cycloalkylene group, and R¹¹ to R¹⁸ each represent one of a hydrogen atom and an alkyl group, and wherein the structures represented by general formula (I) include the structure represented by formula (I-1) and the structure represented by formula (I-2):

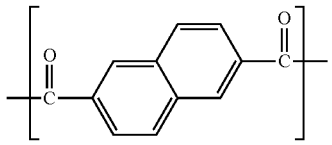
(I-1)

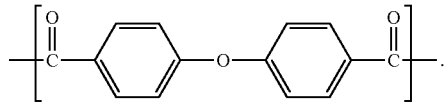
(I-2)

2. The electrophotographic photosensitive member according to claim 1, wherein the ratio of the moles of the structure represented by formula (I-1) to the total moles of the structures represented by general formula (I) is 25% by mole to 75% by mole, and wherein the ratio of the moles of the structure represented by formula (I-2) to the total moles of the structures represented by general formula (I) is 25% by mole to 75% by mole.

3. The electrophotographic photosensitive member according to claim 1, wherein the ratio of the moles of the structure represented by formula (I-1) to the total moles of the structures represented by general formula (I) is 25% by mole to 50% by mole, and wherein the ratio of the moles of the structure represented by formula (I-2) to the total moles of the structures represented by general formula (I) is 25% by mole to 50% by mole.

4. The electrophotographic photosensitive member according to claim 1, wherein X² in general formula (II) represents a single bond.

5. A process cartridge capable of removably mounted to an electrophotographic apparatus, the process cartridge comprising:
at least one device selected from the group consisting of a charging device, a developing device, a transfer device, and a cleaning device; and
an electrophotographic photosensitive member being held together with the at least one device in one body, the electrophotographic photosensitive member including a surface layer containing a polyester resin having structures represented by general formula (I) and a structure represented by general formula (II):

(I)

wherein in general formula (I), X¹ represents a divalent group; and

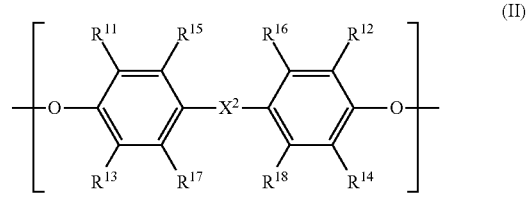
(II)

wherein in general formula (II), $X^2$ represents one selected from the group consisting of a single bond, an oxygen atom, a divalent alkylene group, and a divalent cycloalkylene group, and $R^{11}$ to $R^{18}$ each represent one of a hydrogen atom and an alkyl group, and wherein the structures represented by general formula (I) include the structure represented by formula (I-1) and the structure represented by formula (I-2):

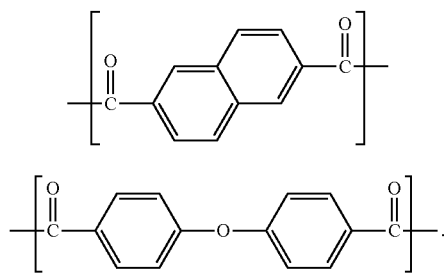

(I-1)

(I-2)

6. An electrophotographic apparatus comprising:
a charging device; an exposure device; a developing device; a transfer device; and
an electrophotographic photosensitive member including a surface layer containing a polyester resin having structures represented by general formula (I) and a structure represented by general formula (II):

(I)

wherein in general formula (I), $X^1$ represents a divalent group; and

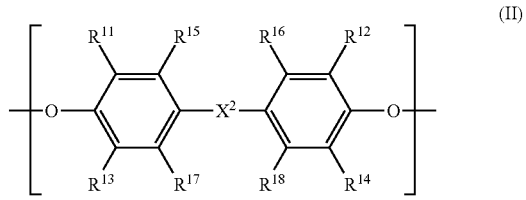

(II)

wherein in general formula (II), $X^2$ represents one selected from the group consisting of a single bond, an oxygen atom, a divalent alkylene group, and a divalent cycloalkylene group, and $R^{11}$ to $R^{18}$ each represent one of a hydrogen atom and an alkyl group, and wherein the structures represented by general formula (I) include the structure represented by formula (I-1) and the structure represented by formula (I-2):

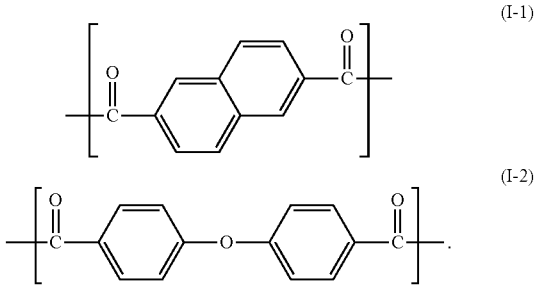

(I-1)

(I-2)

* * * * *